United States Patent [19]
Kletter et al.

[11] Patent Number: 5,931,960
[45] Date of Patent: Aug. 3, 1999

[54] METHOD AND APPARATUS FOR HANDLING ERROR DIFFUSION VALUES

[75] Inventors: Doron Kletter, San Mateo; Donald J. Curry, Menlo Park, both of Calif.

[73] Assignee: Xerox Corporation, Stamford, Conn.

[21] Appl. No.: 08/962,021

[22] Filed: Oct. 31, 1997

[51] Int. Cl.[6] .................................................. G06F 11/00
[52] U.S. Cl. ........................ 714/704; 358/456; 382/252; 382/255
[58] Field of Search ........................... 714/704; 358/456; 382/252, 255

[56] References Cited

U.S. PATENT DOCUMENTS

| | | | |
|---|---|---|---|
| 4,937,666 | 6/1990 | Yang | 358/136 |
| 5,608,821 | 3/1997 | Metcalfe et al. | 382/252 |
| 5,825,509 | 10/1998 | Nomura | 358/456 |

*Primary Examiner*—Phung M. Chung
*Attorney, Agent, or Firm*—Fay, Sharpe, Beall, Fagan, Minnich & McKee, LLP

[57] ABSTRACT

A method and system accumulates an error from an error diffusion process used for rendering continuous images. A scan from an original document generates a plurality of original pixel values which are adjusted by an accumulated error value corresponding to the total effect of neighboring pixels. The adjusted pixel error value is determined between the adjusted pixel value and an output. The adjusted pixel error value is weighted by a predetermined weighting technique and diffused among a plurality of neighboring pixel locations to generate a plurality of intermediate pixel error values. Intermediate pixel errors are accumulated and stored in an error buffer before being combined with an original pixel value. Repetitive access to a memory location associated with the adjusted pixel value is obviated by accumulation of the intermediate pixel values in intermediate registers. A compressor compresses the diffused error values before storage in a buffer as accumulated error values.

40 Claims, 5 Drawing Sheets

METHOD AND APPARATUS FOR HANDLING ERROR DIFFUSION VALUES

BACKGROUND OF THE INVENTION

This invention pertains to the art of data processing systems and, more particularly, to error diffusion for rendering continuous tone images to a binary pattern of dots for the purpose of printing or displaying on a binary output device. The invention is specifically applicable to a processing system for the more efficient handling of an error innovation sequence generated by an error diffusion technique and the compression of accumulated error values from the sequence to reduce storage size in a line buffer. The invention provides the significant advantages of increased memory efficiency and reduced memory size, and the avoidance of a need for an external memory to a processor chip, for a binary printing or display device. However, it will be appreciated by those skilled in the art that the invention could be readily adapted for use in other applications as, for example, where similar data streams are sequentially accumulated for storage in a line buffer type of register.

Error diffusion is a well known technique for rendering continuous tone images to patterns of dots for the purpose of printing or displaying on a binary device. The error diffusion technique is often the preferred technique of rendering for low to medium resolution devices (under 600 dots per inch), particularly since the error diffusion method does not embody a predetermined threshold array as in the traditional clustered dot screening techniques. The lack of any such structured cell enables the error diffusion to rapidly track the input data positions, making it better capable of rendering high frequency detail. The alternative methods require large size arrays to accommodate as sufficient a number of gray levels as are needed for high quality reproduction (it has been determined that the human eye can distinguish between some 200 shades of gray). Such large size arrays can become visually noticeable in the output; thus, the array size, and the corresponding number of gray levels, must be compromised against the desired image quality.

The error diffusion method typically involves a single pass with a scanning device over the input image, during which each pixel is processed sequentially. The conventional process consists of thresholding the input pixel value and replacing it with one of two values, on or off. As each pixel is so changed, an error is introduced to the local gray level of the image. The error is the difference in gray level between the scan determined original pixel value and the "on" or "off" density printed or displayed value. This error is diffused to neighboring pixels by adjusting the values of the neighboring pixels to preserve the local gray level prior to thresholding that had appeared to the eye of the viewer. In order to avoid multiple passes over the image, the error is only propagated (or "diffused") among future pixels that have not yet been processed (e.g., to pixels located to the right and below the current pixel for a left-to-right scan order). Several methods for determining how to distribute the error among the neighboring pixels are well known.

FIG. 2 demonstrates the principles of the error diffusion technique with a particular well known filter scheme. It should be noted the FIG. 2 diffusion scheme was originally derived by Floyd & Steinberg, and are included here only for the purpose of illustration. However, this example can still demonstrate the technique of the subject invention, its implementation, and can be used to clearly illustrate the differences between the subject invention and conventional error diffusion techniques.

In FIG. 2, the squares 10 represent the input image pixels on a raster grid as determined from an input scanning device. The pixels in black and white 12, 14 were already processed, thresholded, and binarized to be either on or off. The shaded pixels 16 have not yet been processed. The center pixel 18, surrounded by a dark frame, is the pixel to be processed next. The arrows leading from the current pixel to weighted values ①, ③, ⑤ and ⑦ indicate how the current threshold error is to be distributed to the neighboring pixels. It is often referred to as the "error diffusion filter" in the literature because the application of a specific weighting scheme is in effect a filtering of the calculated error between what the scanner detects and the printer prints for each pixel. The numbers along the arrows describe the [possibly varying] non-normalized relative neighbor weight. For example, the number ⑦ associated with the pixel immediately to the right of the current pixel 18 indicates that 7/16 of the error will be used to adjust this pixel, where 16 is the normalization factor equal to the total sum of the weights. As each of these neighbors is so adjusted, its associated gray value is changed (making it darker or lighter, depending on the sign of the error), and the updated value is what will be used for thresholding the neighboring pixels.

Based on the above description, a conventional error diffusion technique is composed of the following three basic steps:

first, a thresholding step, in which the current original pixel value is compared with a given threshold to determine the output for the printing or displayed pixel;

second, an error calculation step, where the error is calculated by subtracting the binary output level from the original pixel value; and third, the error is filtered according to the selected weighting scheme and distributed to the neighboring pixels.

This process then advances by one pixel and repeats, until the end of a line is reached.

The conventional error diffusion process is illustrated in FIG. 3. The notation here is that $x(i,j)$ is the current pixel value, $e(i,j)$ is the error and $\Delta x(i,j)$ is the compensation value to the pixel at location $(i,j)$. Also, small rectangles represent data registers, bold lines indicate buses and thin lines indicate binary values.

As can be seen from FIG. 3, the conventional method requires multiple accesses to a memory to accumulate the sequence of compensation values. For each pixel processed, the system needs to read in a number of error values for neighboring pixels, modify them and write the results back to the memory. This is clearly inefficient, as the value of every pixel must be so adjusted multiple times. For example, the value of the shaded pixel labeled ⑤ in FIG. 2 will be "read-modified-written" once for the error generated in the current cycle, only to be "read-modified-written" again when the process moves onto the next pixel (this time via the ③ filter weight, assuming a left-to-right process).

The repetitive access to the memory is costly in terms of time consumption and inefficient in data handling and is one specific problem sought to be overcome by the subject invention.

Another particular problem with a conventional error diffusion system is memory size. The amount of memory needed to store and accumulate relevant error values for a raster scan is such that an external memory to a processing chip usually has to be employed. Again, the inefficiencies of accessing external memory, as well as the additional costs involved, presents a substantial need to minimize the amount of context memory employed for any real time application of an error diffusion technique.

The error diffusion method illustrated in FIG. 3 requires storing at least one line of context in memory, due to the fact that the current pixel error directly modifies the values of pixels below it, about one scanline away. In practice, this context can be quite large. A typical 8.5 inch wide four color page printed at 600 dpi, for example, would require keeping at least 20,000 cells of data in memory, with each cell large enough to contain all the information needed to process one single pixel. For reasons detailed below, the usage of eight bits of precision per cell may not be sufficient. Assuming that 12 bits per cell are used, the overall storage requirement for this example translates to some 30 K bytes of memory. Such storage sizes are not cost effective to implement on a single chip using current low-cost silicon technology, and are much better utilized using external memory devices. It is therefore also substantially needed to reduce the overall system cost by applying compression techniques to significantly reduce the cell size, thereby lowering the total memory size, without comprising the image quality.

Considering the minimum cell size, it is well known that the human visual perception system cannot distinguish more than about 200 shades of gray, implying that 8 bits per pixel is adequate for gray scale image representation. Current practice typically uses the 8 bit system to compactly encode each continuous tone image separation. Thus, color images are typically encoded using three 8-bit separations or more, e.g., three as in "red, green and blue" or "cyan, magenta and yellow"; four as in "cyan, magenta, yellow and black"; or even more with hi-fidelity color reproduction. The 8 bit system does not have the capability to handle the error filtration and feedback mechanism discussed above. The value of any single pixel error can be as large as the largest absolute difference between the compensated gray level and the threshold, where the latter may also be varying through the process as part of several other enhancement techniques. The total sum of error contributions to any given pixel depends on the image content and past error propagation history, and may occasionally add up to a large value. Also, these contributions can be negative or positive, while pixel values are considered to be positive integers only. When added to the neighboring pixel values, these contributions may well cause the overall result to overflow the 8 bit range and even become too large, or negative. Hence larger ranges, i.e., more bits, are usually needed.

Furthermore, noise may also have to be injected as a common practice to eliminate various rendering artifacts, thus contributing to increase the size of the error values. The Floyd & Steinberg method illustrated above employs a deterministic error diffusion filter. That is, the way the error is distributed to the neighboring pixels remains constant and fixed for all pixels. Floyd & Steinberg, based on experimentation, concluded that the filter shown in FIG. 2 has the minimum filter size (in terms of the number of weights) required for producing acceptable rendering quality. However, rendering artifacts may remain visible at the output, particularly at some specific gray levels. These artifacts are typically manifested as "worming artifacts", where several stray dots appear, in the viewers mind, to be connected in the form of short line segments. One effective method to further eliminate these artifacts is to inject additional pseudo-random noise in the process. The noise helps to "dither" the dot positions around with respect to the threshold, thereby breaking apart the line segment structures into smaller, less visible ones. Larger noise levels may be more effective to eliminate the said artifacts, but may also lead to an increase in the apparent level of "graininess" of the image. This is the reason why 10 to 12 bits per error value are often used in common practice.

Due to the random nature of the error diffusion technique and the associated high-frequency content, it is well known that it is relatively difficult to compress error diffused images. Most standard compression techniques available will fail to produce a significant compression ratio. The same generally holds true for compression of the error sequence, although there is an obviously large reduction in information content in going from an 8 bit continuous tone image to binary output on paper or display.

The present invention contemplates a new and improved apparatus and method which overcomes all the above-referred to problems and others to provide a new error diffusion system which is economical to manufacture, readily adaptable to a plurality of diffusion techniques having a variety of dimensional data characteristics and which provides improved compression of the residual error streams and more efficient handling of the memory in a preferred error diffusion technique.

BRIEF SUMMARY OF THE INVENTION

In accordance with the present invention, there is provided a method of accumulating an error value from an error diffusion process used for rendering continuous images, wherein the error value is handled more efficiently by the system and is transformed into a compact form for storage in an error buffer. The system comprises scanning an original document by a predetermined technique relative to individual pixel locations, wherein a sequence of original pixel values of the original document are identified and read into an input buffer. The original pixel values are adjusted by an accumulated error value corresponding to the total effect of neighboring pixels on the current pixel for determining an adjusted pixel value determinative of an output to be displayed by a printer or display at a corresponding location to the original pixel. An adjusted pixel error value is determined between the adjusted pixel value and the output to the display. The adjusted pixel error value is weighted by a predetermined weighting technique and diffused among a plurality of neighboring pixel locations for generating a plurality of intermediate pixel error values. The intermediate pixel error values are accumulated and stored in an error buffer before being combined with the original pixel value at the adjusting step, whereby repetitive access to a memory location associated with the adjusted pixel value for storing the accumulated error value is obviated by the accumulation of the intermediate pixel error values in the intermediate register.

In accordance with another aspect of the present invention, a compressor is disposed intermediate to the diffuser and the error buffer for compressing the diffused error values before storage in the error buffer as accumulated error values. The compressor preferably includes a quantizer to reduce the number of bits needed for representing the diffused error value. The compressed error values are stored in memory and are decompressed and combined with the diffused adjusted pixel error values for modifying the sequential accumulation for improved maintenance of adequate gray levels at the display or printer.

In accordance with another aspect of the present invention, a particular circuit configuration for a binary weighted image error diffusion rendering system is provided, wherein remainder bits generated in each division of the distribution process are fed into the carry-in inputs of subsequent adders, so that no additional accumulator hardware is required.

In accordance with another aspect of the present invention, the error buffer comprises a horizontal error buffer and a vertical error buffer. Intermediate registers comprise a forward error buffer and a backward error buffer, which sequentially accumulate vertical error state values before final accumulation and storage in the vertical error buffer.

One benefit obtained by the present invention is a significant increase in the memory efficiency of an error diffusion system by reducing the total number of access cycles to just one memory read and one memory write operation per pixel, regardless of the filter size.

Another benefit obtained from the present invention is a transformation of the error value into a compact form for significantly improving the error diffusion memory utilization, while preserving adequate local gray levels, and with no appreciable reduction in image quality.

Other benefits and advantages of the subject new error diffusion systems and methods will become apparent to those skilled in the art upon a reading and understanding of this specification.

BRIEF DESCRIPTION OF THE DRAWINGS

The invention may take physical form in certain parts and arrangements of parts, the preferred embodiments of which will be described in detail in this specification and illustrated in the accompanying drawings which for a part hereof and where in.

DETAILED DESCRIPTION OF THE INVENTION

The subject invention improves and further enhances conventional error diffusion techniques to remedy the above deficiencies and limitations. Specifically, it offers a new and efficient method to significantly increase the memory efficiency by reducing the total number of access cycles to just one memory read and one memory write operation per pixel, regardless of the filter size. This is accomplished by "reversing" the sequence of operations such that the "write" precedes the "read" relative to a line buffer in memory. Instead of updating all the relevant pixel values in the line buffer as each error is being diffused, the invention first accumulates the intermediate $\Delta x(i,j)$ pixel updates in a local register. Only when all possible error contributions to a given pixel have been summed, is the accumulated result then written to the line buffer. Finally, as the error diffusion progresses and it is now time to handle the pixel at the (i,j) location, and the actual pixel value $x(i,j)$ become available at the input, then the updated summation value is read back from the line buffer and immediately used to compensate $x(i,j)$.

An extremely efficient utilization of the line buffer memory and bandwidth can be achieved following a proper organization of its content. The proposed method separates the adjusted pixel error into two components, the horizontal error state and the vertical error state. The horizontal error state $e_x$ is the error carried in the fast scan direction of processing. The vertical error $e_y$ is the error carried in the slow scan direction from the current line to the line(s) that have not yet been processed. Clearly, the horizontal error is much less costly to handle than the vertical state since the information in it is of much shorter term. It is generated and shortly thereafter consumed across several pixels. The vertical state information, on the other hand, needs to be preserved across lines.

At each error diffusion cycle, one vertical error is retrieved from the line buffer and used for compensating the current pixel, for example the i-th. As this location becomes free, it is re-written with the new vertical error for the i-th pixel on the next line. Of course, the write operation is delayed to account for the error diffusion filter span. Hence the efficiency is expressed by one "read" operation followed by one "write" operation per pixel.

The total amount of memory needed is the one line buffer for storing the vertical error state plus a few local registers for storing the horizontal state. The number of such registers equals the horizontal span of the error diffusion filter minus one.

Figure 1:
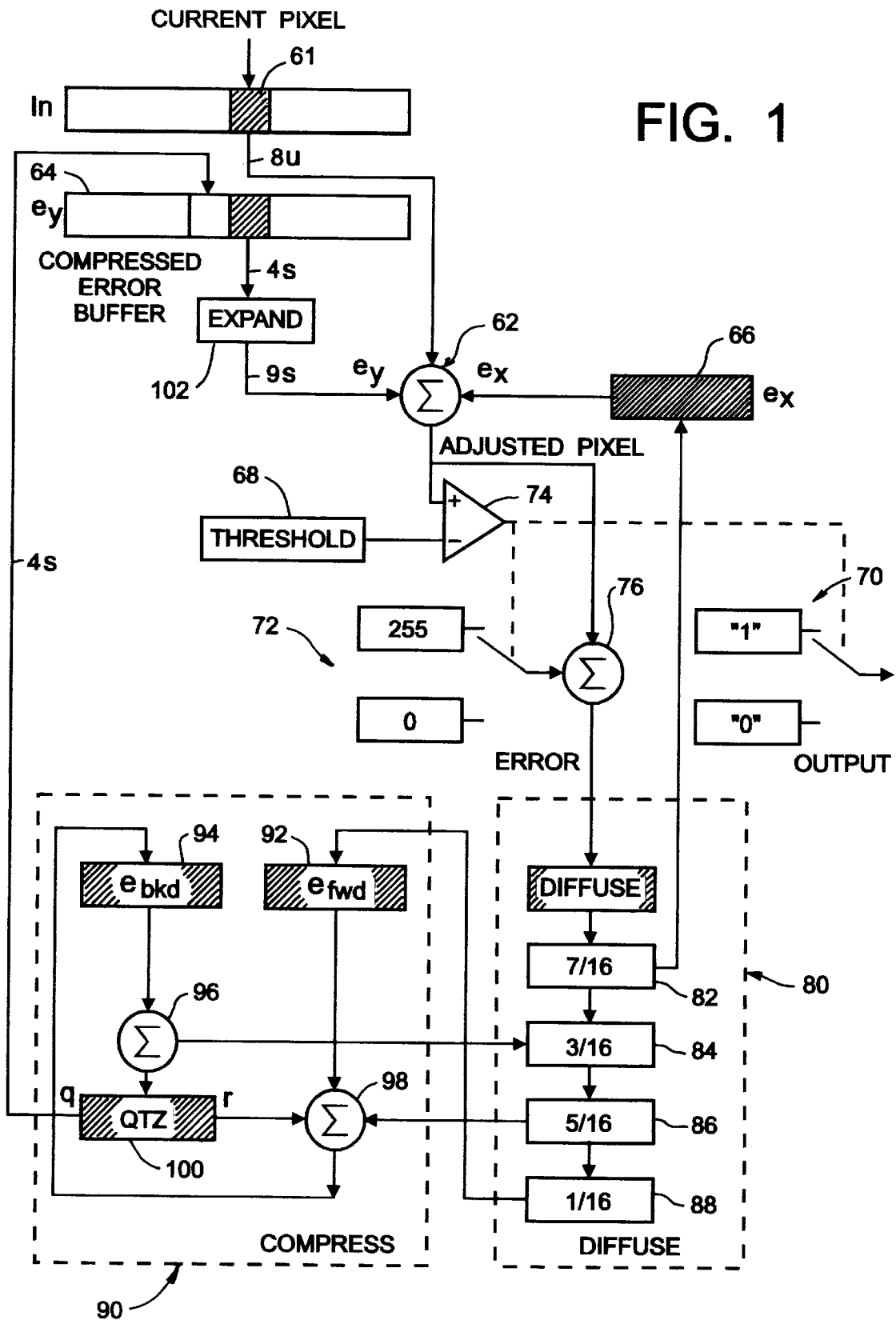
FIG. 1 comprises a block diagram of a preferred embodiment of the present invention.

Referring now to the drawings, wherein the showings are for purposes of illustrating the preferred embodiments of the invention only and not for purposes of limiting same, FIG. 1 shows a block diagram of a storage system for handling an original pixel value generated by a scanner that is intended to be accurately reproduced on a binary display, such as a video screen or printer, while maintaining an adequate local gray level. The invention is applicable to conventional error diffusion techniques wherein a difference between the original pixel value and the binary output are computed and diffused along neighboring pixels of the display so that it appears to the viewer that the local gray level is preserved. The subject invention is particularly applicable to the handling and storage of the error innovation sequence to be applied to a particular pixel from neighboring pixels to maintain the desired preservation of the gray level of the display.

FIG. 1 illustrates one possible implementation of an error diffusion technique practiced in accordance with the present invention and corresponding to the above-discussed Floyd & Steinberg example of neighboring pixel weighting techniques. With corresponding reference to the flow chart of FIG. 4, the invention first involves scanning 40 an original document to obtain an original or current pixel value of the current scan line whose location along the line is shown in dark, block 61. In the embodiment of FIG. 1, the current pixel value comprises 8 bits unassigned and is adequately representative of an original gray scale image or text pixel, from one color separation, if any, on the original document. Processing element 62 adjusts the current pixel value by combining it with a corresponding accumulated error value for generating an adjusted pixel value determinative of an output to be displayed by the binary display at the corresponding pixel location on the display. The adjusting comprises a summing of these values. In FIG. 1, the accumulated error value is stored in a vertical error buffer $e_y$ 64 holding a vertical error state value and a horizontal error buffer, $e_x$ 66 holding a horizontal error state value. Processing element 62 can combine all three of these quantities simultaneously to generate an adjusted pixel value determinative of the output. The adjusted pixel value is compared 44 with a threshold value 68 determinative of whether the binary output should be on "1" or off "0", as indicated at 70. In addition, the on or off state is assigned 46 an output value 72 corresponding to the gray scale or range employed by the scanner. Since in FIG. 3, 8 bits are used, an output on value is "255" and an output off value is "0". It should noted that for binary error diffusion, a single comparator 74 is sufficient. For multi level error diffusion, more comparators (and thresholds) may be required. The threshold register(s) 68 can either be fixed or vary from one pixel to the next for the purpose of further enhancing the output and eliminating some rendering artifacts.

The processing element 76 preferably comprises an adder for combining 48 the adjusted pixel value with the corresponding gray level of the output, 255 or 0, to determine an adjusted pixel error value therebetween. For example, if the adjusted pixel value were 200, and the threshold were smaller, the corresponding pixel output would be "on", the corresponding compensation value would be "255", and the adjusted pixel error value would be "−55". It should also be noted that the subject inventive scheme can be easily extended to support multi-level error diffusion with multiple decision, using a number of comparators and adders followed by appropriate selection logic.

Figure 2:
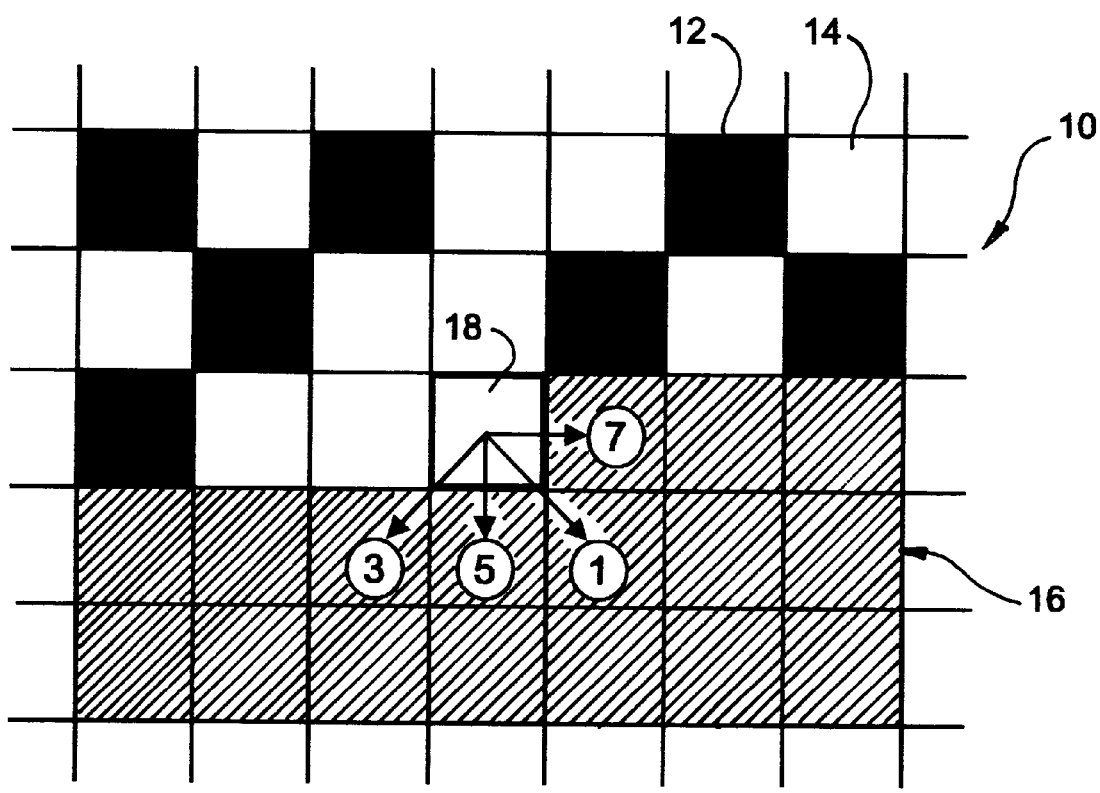
FIG. 2 illustrates a conventional scanning and weighting technique of error diffusion.

The adjusted pixel error value is fed to the diffuser 80 logic which calculates 50 various error magnitudes to be distributed to neighboring pixels in accordance with whatever predetermined weighting techniques apply for the selected error diffusion filter. For the subject sample, the diffuser 80 calculates the error values among four filter taps (1/16, 3/16, 5/16 and 7/16) in accordance with the weighting and distribution scheme illustrated in FIG. 2. Care must be taken to ensure accurate and complete distribution of the error value, otherwise, small errors resulting from finite numerical precision and/or rounding errors may accumulate over the printed page or display. With integer filter weights such as are employed in the subject example, the diffusion can be easily accomplished by using simple add operations.

The actual diffuser implementation naturally strongly depends on the performance requirements. For maximum speed, all four error taps can be generated at once using parallel logic. If, however, the external device operates at a slower speed (compared with the internal clock speed of the subject circuit), then the error values can be generated one at a time, thereby reducing the cost by reconfiguring and sharing one weight logic multiple times. In the latter case, the sequence in which the taps are calculated can be ordered to minimize the hardware storage and complexity. Thus, for example, the context of the 7/16 error tap 82 (corresponding to the new horizontal state error value) can be generated first and immediately stored into the horizontal error buffer $e_x$ register, 66, replacing the old value that is no longer needed.

Figure 3:
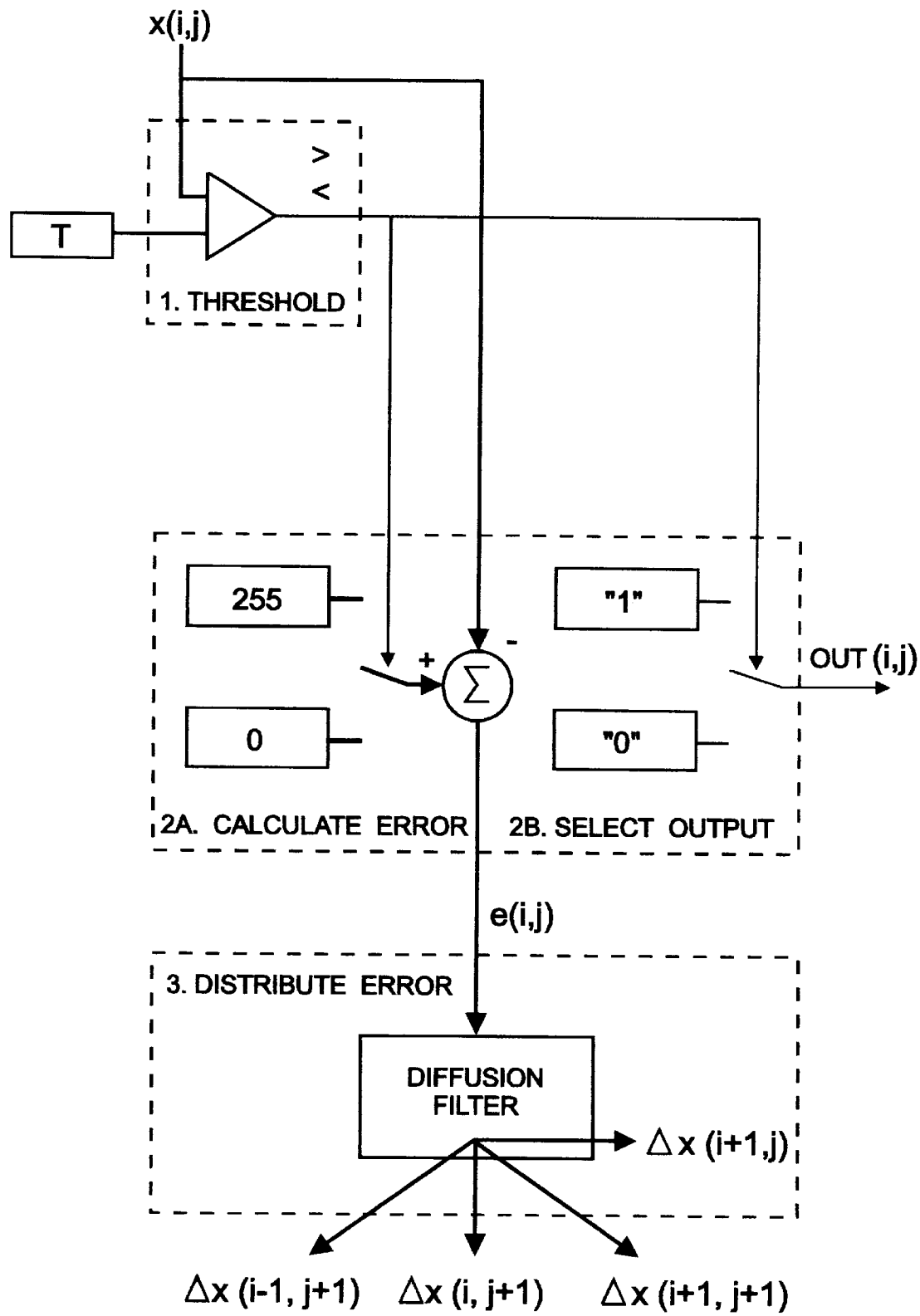
FIG. 3 comprises a block diagram of a conventional error diffusion system.
Figure 4:
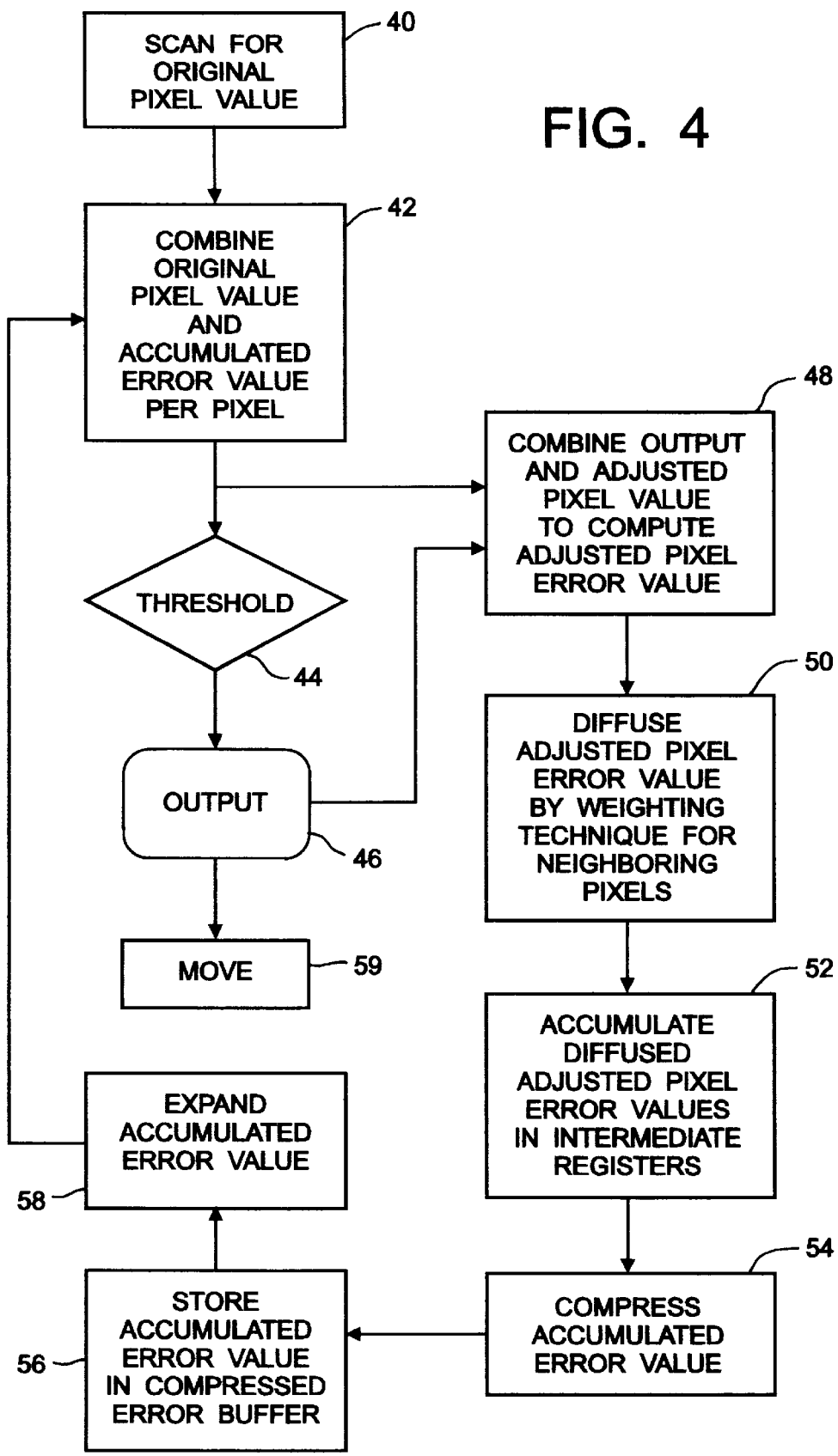
FIG. 4 is a flow chart of the method of the preferred embodiment of the invention.

A distinction to be noted between the embodiments of FIG. 1 and FIG. 3 is that the adjusted pixel error value computed by the subject invention is not based upon the current pixel value for error calculation, but rather the adjusted pixel value generated by the adder 62. In the conventional system of FIG. 3, the current pixel value, x(i,j) must already be a compilation of the original pixel value and accumulated errors, which accumulation must occur prior to storage or in the line buffer storing current pixel values.

Continuing on with the subject invention, the second tap 84 to be calculated is the 3/16 tap, which contains the current error contribution to the pixel located immediately below and to the left of the current pixel (FIG. 2), the third tap is the 5/16 tap 86 and the fourth tap, the 1/16 tap 88. The three latter taps 84, 86, 88 are all input into compressor 90, which contains an intermediate register set and a compressor for compressing the errors into a compressed accumulated error value for more compact storage in the vertical buffer $e_y$ 64. Compressor 90 includes intermediate registers $e_{FWD}$ 92 and $e_{BKD}$ 94, adders 96, 98 and a quantizer 100. The sequential accumulation 52 of diffused adjusted pixel error values in the intermediate registers 92, 94 occur in the sequence corresponding to the left-to-right scan sequence shown in FIG. 2. Accordingly for accumulating the vertical error state value, for a particular pixel, the 1/16 tap 88 is computed and stored in the $E_{FWD}$ register 92. As the scan would continue so that the current pixel would then be immediately above the pixel for which errors are being accumulated, the next 5/16 tap would be added to the value contained in the $e_{FWD}$ register 92 by adder 98, along with a remainder r from the quantizer 100, as will be explained in more detail later. The value from adder 98 is then stored in the second intermediate register $e_{BKD}$ 94 to continue to accumulate the error contributions for the subject pixel. Lastly, as the current pixel moves to the right and above the subject pixel, the value from the 3/16 tap 84 is added to the content of the $e_{BKD}$ register 94 by adder 96. The value from adder 96 comprises an expanded, fully accumulated vertical error state value. The value can now be written to memory 64 and stored away until it is time to process that particular pixel.

It is a feature of the invention that the final accumulated error value from adder 96 is compressed 54 before storage in the error buffer 64. The result is therefore quantized by the quantizer (QTZ 100), compressed to 4 bits, for example, but other sizes could be employed depending on the desired trade off between quality retention or compression extent, and then written back to the error diffusion buffer as the quantized output q. As noted above, the resulting quantization error (the remainder r output from the quantizer 100) is fed back to modify the value of the forward register $e_{FWD}$ 92. This crucial step, in essence, forwards the remainder error to the next pixel on the next line, thereby maintaining the correct gray level overall. Alternatively, the remainder r can be directly inputted to the adder 76 or adder 96 instead of adder 98, and then the quantization error would be used to effect the filter weight for the next pixel value, which may be useful for eliminating artifacts. Hence, the "compression" process works in tandem with the error diffusion process, to preserve the correct gray level and at the same time to reduce the resulting error stream size. In this sense, the compression is "visually lossless". The result from the compressor 90 is stored 56 in the compressed error buffer 64 and thus comprises a compression of the vertical error state. Buffer 64 is sized to store enough vertical error states before a particular one is need to be combined with the horizontal error state in the horizontal error buffer 66 and the original pixel value at adder 62. However, storage in a compressed state substantially reduces the size requirements for line buffer 64. Before the addition of these values in processing element 62, the compressed value, which is indicated as 4 signed bits, is expanded 58 by expander 102 to nine signed bits. The system can then move 59 onto the next pixel location and repeat.

Regarding the boundary conditions at the beginning and end of each line, one approach, often preferable in hardware implementations, is to increase the line size, and error buffer, respectively, by a few pixels on each side (corresponding to one less of the error diffusion filter width) and assume known values for these (typically either white or replicating the first/last pixel values from each line). A second alternative is to adjust the filter taps on the first few pixels, as to not protrude beyond the true line limits. For example, the error diffusion filter in the example above, for the first pixel on a line would combine the 3/16 tap with the 7/16 tap to produce a single, straight down tap with 10/16 weight, etc. The first method, the preferred for hardware implementation, has the advantage of keeping the diffusion filter fixed at the expense of line extension (i.e., larger buffer storage, more diffusion cycles).

Figure 5:
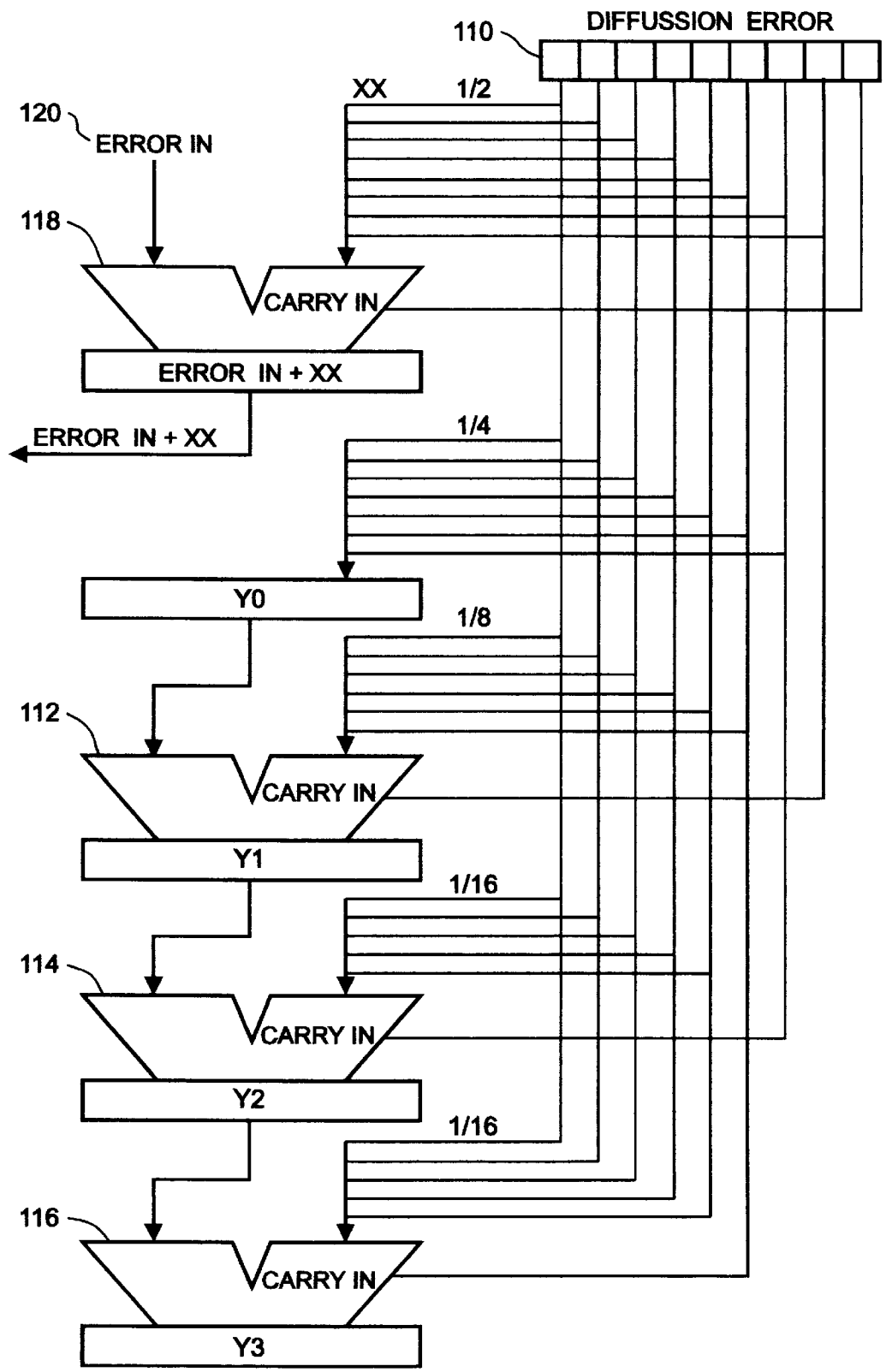
FIG. 5 is one particular hardware implementation of a diffuser for a binary weighted error diffusion system.

With particular reference to FIG. 5, a system for distributing the error value when implementing image to error diffusion rendering that uses a binary width distribution pattern is shown.

Larger size binary weighted distribution patterns have proven to be good alternatives to the original Floyd & Steinberg weighting systems discussed above and have the advantage of being simpler to implement since binary multiplications are manifested as shifts. One good example is 8, 4, 2, 1, 1, (for distribution wt_xx, wt_0, wt_1, wt_2, wt y3 as seen in FIG. 5), respectively. Each of the weights is a binary power and the sum of the weights is also a binary power. This makes it easy to compute the total of the error which needs to be added to each distribution term since division by two is just a shift. The method implemented by the apparatus of FIG. 5 is an economical way of distributing the remainders of each division so that the distribution process does not lose the information. This is accomplished by feeding various remainder bits into the carried inputs of existing adders. The important point is that no additional hardware is required since there are only four remainders to distribute and four of the five designations of distributed errors already have adders for other reasons. More particularly, no accumulator is required for the division residue, since the residues can be sequentially accumulated via the carry in inputs.

More particularly, FIG. 5 illustrates a diffusion error buffer 110 for storing adjusted pixel error values to be diffused among a plurality of neighboring pixels to a current pixel. A plurality of intermediate registers, Y0, Y1, Y2 and Y3 are disposed holding intermediate pixel error values. For example, the diffusion error buffer is sized to hold a 9 bit signed error value, a division by one-quarter to assign a one-quarter weight tap to register Y0 comprises merely a shifting of error buffer 110 two positions to drop the two LSBs and load the six MSBs into Y0. In accordance with the scanning technique, if the one-quarter weight tap is to be summed with a one-eighth weight tap, then the error value Y0 can be so accumulated via accumulator 112 and stored in register Y1. Similarly, as the sequential scanning continues, the sequential values being loaded into the diffusion error buffer will be accumulated as one-quarter plus one-eighth plus one-sixteenth plus one-half. The xx value corresponds to a horizontal error state value weighting. Accumulators 114, 116, 118 effect the central accumulation. Error in 120 to accumulator 118 comprises an accumulation of the vertical error state values. The output from accumulator 118, error in plus xx, is the value to be stored in the error buffer.

It is a feature of the invention that division residue from the shifts for assigning the respective weighting taps is not lost, but is sequentially distributed to the accumulator set via the carry in inputs of each accumulator.

To divide a binary number by two, you simply need to select the bits left of the least significant bit. The least significant bit then becomes the remainder of the divide and is distributed to the carry and inputs. The previous systems accumulated this distribution error and added it into one of the destinations using separate operation. The subject invention results in a more uniformed distribution and avoids the hardware of an accumulator for summing these distribution errors.

It is to be particularly noted that the subject invention will be efficient with respect to the memory access described above, regardless of whether the error data is compressed or not. To bypass compression altogether, it is sufficient to eliminate the quantizer block QTZ 100 and replace it with a wire that simple transfers the untouched input to the q output of the compressor 90, always returning to 0 at the remainder output r. To enable simple, yet significant compression, a uniform quantization of input space can be applied in which the QTZ block 100 simply captures just the top few (most significant) order bits. Alternatively, a quantizer 100 can be designed for companding the input space via a non-linear mapping (such as a logarithmic scale) to achieve better compression at the expense of adding a small look-up table.

As indicated above, although the subject invention has been illustrated using the Floyd & Steinberg example, the fundamental technique is quite general and can be customized to work with any arbitrary error diffusion filter, multi-level error diffusion, randomized thresholding and other quality enhancement a variations.

The subject invention is applicable to copiers, printers and multi-functioning devices. It can significantly reduce the cost of printer/copier/fax electronics by enabling much lower cost rendering than any other system and yet still presents further possibilities for additional enhancements.

The invention has been described with reference to preferred and alternative embodiments. Obviously, modifications and alterations will occur to others upon a reading and understanding of the specification. It is our intention to include all such modifications and alterations in so far as they come within the scope of the appended claims or the equivalents thereof.

Having thus described our invention, we now claim:

1. A method of accumulating an error value from an error diffusion process used for rendering continuous images with a binary display, wherein the error value is transformed into a compact form for storage in an error buffer, comprising:

reading a current pixel value representative of an original image at a current pixel location;

adjusting the current pixel value with an accumulated error value for determining an adjusted pixel value determinative of a binary output to be displayed by the binary display at a corresponding current pixel location;

determining an adjusted pixel error value between the adjusted pixel value and the output;

diffusing the adjusted pixel error value by a predetermined weighting technique among a plurality of neighboring pixel locations for generating a plurality of intermediate pixel error values;

accumulating selected ones of the intermediate pixel error values in an intermediate register;

compressing the selected ones into a compact form accumulated error value;

storing the compact form accumulated error value in the error buffer; and, expanding the compact form accumulated error value into the accumulated error value for access in said adjusting whereby a large compression ratio is achieved for data in the error buffer while preserving an adequate local gray level and with no significant reduction in image quality.

2. The method as claimed in claim 1 wherein said diffusing includes identifying predetermined space relationships between the current pixel location and the neighboring pixel locations, the selected ones of the intermediate pixel error values being based on the space relationships, and wherein said accumulating comprises summing at least two of the intermediate pixel error values each respectively associated with distinct ones of the predetermined space relationships.

3. The method as claimed in claim 2 wherein said accumulating further comprises summing a sequence of the intermediate pixel error values, each of said sequence being associated with a distinct one of the predetermined space relationships.

4. The method as claimed in claim 3 wherein said error buffer comprises a horizontal error buffer for storing a horizontal error state value and a vertical error buffer for storing a vertical error state value, and wherein said summing the sequence comprises accumulating a plurality of the intermediate pixel error values in the vertical error buffer.

5. The method as claimed in claim 4 wherein said intermediate register comprises a set of registers corresponding to the predetermined space relationships and said summing the sequence further comprises sequentially accumulating the intermediate pixel error values in said set of registers.

6. The method as claimed in claim 5 wherein the compressing includes quantizing a sum from the sequentially accumulating before storing in the error buffer, said quantizing generating a quantization error.

7. The method as defined in claim 6 wherein said quantizing includes retaining the selected most significant bits (MSBs).

8. The method as defined in claim 6 wherein said quantization error is summed with said intermediate pixel error values in the intermediate register for maintaining the adequate local gray level.

9. The method as defined in claim 6 wherein said predetermined weighting technique is a binary weighting, wherein a division error from one stage is applied as a carry in input of a next stage of said set of intermediate registers during said sequentially accumulating.

10. A method of accumulating an error value from an error diffusion process used for rendering continuous images with a binary display comprising:

scanning an original document by a predetermined technique relative to individual pixel locations wherein a sequence of original pixel values of the original document are identified;

adjusting the original pixel value by an accumulated error value for determining an adjusted pixel value determinative of a binary output to be displayed by the binary display at a rendered pixel location corresponding to the scanned original pixel location;

computing the difference between the binary output and the adjusted pixel value, the difference comprising an adjusted pixel error value;

diffusing the adjusted pixel error value by a predetermined weighting technique for generating a diffused adjusted pixel error value for each pixel location based upon intermediate pixel error values affecting the each pixel location in accordance with the predetermined weighting technique;

disposing a set of relative ones of the intermediate pixel error values in a staggered tier of intermediate registers for sequentially accumulating an error innovation sequence in accordance with the sequence of the scanning technique;

storing an accumulated error value in an error buffer comprising a sum of the intermediate pixel error values, whereby repetitive access to a memory location associated with the adjusted pixel value for storing the accumulated error value is obviated by the sequential accumulating of the intermediate pixel error values in the intermediate registers.

11. The method as defined in claim 10 wherein the adjusted pixel value is determined by combining the original pixel value and the accumulated error value.

12. The method as defined in claim 11 wherein an adjusted pixel error value is determined between the adjusted pixel value and the binary output.

13. The method as defined in claim 10 further including compressing the accumulated error value prior to the storing in the error buffer.

14. The method as defined in claim 13 wherein the compressed accumulated error value is expanded prior to the adjusting of the original pixel value.

15. The method as defined in claim 13 wherein a quantization error from the compressing is included in the accumulating of the error innovation sequence.

16. The method as defined in claim 10 wherein the error buffer stores a plurality of accumulated error values comprising a set sized from a first accumulated error value being read out for said adjusting step to a last accumulated error value being read into the error buffer by said storing step in accordance with the scanning and weighting techniques.

17. The method as defined in claim 16 wherein the first and last accumulated error values are being read out and written in, respectively, during a same machine cycle.

18. The method as defined in claim 10 wherein said error buffer comprises a horizontal error buffer for storing a horizontal error state value, and a vertical error buffer for storing a vertical error state value, and the sequentially accumulating comprises accumulating the error innovation sequence in the vertical error buffer.

19. The method as defined in claim 10 wherein said binary display comprises a plurality of pixels, each pixel having a corresponding accumulated error value stored in the error buffer, said method further including limiting accessing of the error buffer to a single write operation and a single read operation per pixel for writing and reading, respectively, the corresponding accumulated error value.

20. An apparatus for reproducing an original document comprising accumulating an error value from an error diffusion process used for rendering continuous images with a binary display comprising:

a scanner for scanning an original document by a predetermined technique relative to individual pixel locations wherein a sequence of original pixel values of the original document are identified;

an adjusting processor for adjusting the original pixel value by an accumulated error value for determining an adjusted pixel value determinative of a binary output to be displayed by the binary display at a rendered pixel location corresponding to the scanned original pixel location;

a difference processor for computing a difference between the binary output and the adjusted pixel value, the difference comprising an adjusted pixel error value;

a diffusing processor for diffusing the adjusted pixel error value by a predetermined weighting technique for generating a diffused adjusted pixel error value for each pixel location based upon intermediate pixel error values affecting the each pixel location in accordance with the predetermined weighting technique;

a staggered tier of intermediate registers disposed for sequentially accumulating an error innovation sequence comprising relative ones of the intermediate pixel error values, in accordance with the sequence of the scanning technique; and, an error buffer for storing an accumulated error value comprising a sum of the intermediate pixel error values whereby repetitive access to a memory location associated with the adjusted pixel value for storing the accumulated error value is obviated by the sequential accumulating of the intermediate pixel error values in the intermediate registers.

21. The apparatus as defined in claim 20 wherein said staggered tier has a number of registers one less than a number of weighting taps of said predetermined weighting technique.

22. The apparatus as defined in claim 20 including an adder for summing contents of at least two of said intermediate registers.

23. The apparatus as defined in claim 20 further including a compressor for compressing the accumulated error value prior to the storing in the error buffer.

24. The apparatus as defined in claim 23 including an expander for expanding the compressed accumulated error value prior to the adjusting of the original pixel value.

25. The apparatus as defined in claim 23 wherein the compressor comprises means for including a quantization in the accumulating of the error innovation sequence.

26. The apparatus as defined in claim 20 wherein the error buffer stores a plurality of accumulated error values comprising a set sized from a first accumulated error value being read out for said adjusting, to a last accumulated error value being read into the error buffer by said storing, in accordance with the scanning and weighting techniques.

27. The apparatus as defined in claim 26 including means for writing in and reading out the first and last accumulated error values, respectively, during a same machine cycle.

28. The apparatus as defined in claim 20 wherein said error buffer comprises a horizontal error buffer for storing a horizontal error state value, and a vertical error buffer for storing a vertical error state value, and the vertical error buffer sequentially accumulates the error innovation sequence.

29. The apparatus as defined in claim 20 wherein said binary display comprises a plurality of pixels, each pixel having a corresponding accumulated error value stored in the error buffer, said apparatus further including means for limiting accessing of the error buffer to a single write operation and a single read operation per pixel for writing and reading, respectively, the corresponding accumulated error value.

30. A document reproduction apparatus for processing a plurality of original pixel values representative of an image or text from an original document and including an error diffuser comprising a control system for more efficient handling of a residual error stream including:

an error buffer for storing a plurality of accumulated error values;

a first processor for associating an original pixel value with a corresponding accumulated error value and for generating an adjusted pixel value determinative of a display output corresponding to the original pixel value;

a second processor for determining an adjusted pixel error value between the display output and the adjusted pixel value;

a diffuser for diffusing the adjusted pixel error value to a plurality of neighboring pixels to an original pixel in accordance with a predetermined diffusion technique; and, an intermediate register set interposed between the diffuser and the error buffer for storing diffused adjusted pixel error values whereby the diffused error values can be temporarily stored and sequentially accumulated in the register set prior to storage in the error buffer for providing a single memory write operation and a single memory read operation to and from the error buffer, respectively, for each accumulated error value.

31. The apparatus as defined in claim 30 wherein the error buffer comprises a horizontal error buffer and a vertical error buffer, the intermediate register set being interposed between the diffuser and the vertical error buffer for storing and sequentially accumulating vertical diffused adjusted pixel error values from the plurality of neighboring pixels.

32. The apparatus as defined in claim 31 wherein said intermediate register set comprises a forward vertical error buffer and a backward vertical error buffer, each sequentially accumulating the vertical diffused adjusted pixel error values pursuant to the predetermined diffusion technique.

33. The apparatus as defined in claim 31 wherein said intermediate register set comprises a number of vertical error buffers for sequentially accumulating the vertical diffused adjusted pixel error values pursuant to the predetermined diffusion technique.

34. The apparatus as defined in claim 31 wherein the compressor includes a quantizer.

35. The apparatus as defined in claim 34 wherein a compressor is disposed intermediate the diffuser and the error buffer for compressing the diffused error values before storage in the error buffer as accumulated error values.

36. The apparatus as defined in claim 35 wherein the quantizer has a remainder output, the apparatus further including means for combining the remainder output with diffused adjusted pixel error values.

37. The apparatus as defined in claim 35 wherein the quantizer has a remainder output, the apparatus further including means for combining the remainder output with the adjusted pixel value at the second processor.

38. A diffuser for distributing error values in a binary weighted diffusion system, comprising:

a diffusion error buffer for holding an adjusted pixel error value;

a plurality of intermediate registers for holding intermediate pixel error values;

an error buffer for holding an accumulated error value comprising an accumulation of the intermediate pixel error values; and, a plurality of accumulators for accumulating the intermediate pixel error values, each accumulator having a carry-in input depending from a bit position of the diffusion error buffer whereby for a division of the adjusted pixel error value in the diffusion error buffer, a quotient comprising a portion of the most significant bits (MSBs) is input to a one of the accumulators and a division residue from the division is input to the one accumulator at the carry in input.

39. The diffuser as claimed in claim 38 wherein each of the intermediate registers is associated with the diffusion error buffer as a weighted tap.

40. The diffuser as claimed in claim 38 wherein the accumulators are disposed to sequentially accumulate the intermediate pixel error values.

* * * * *